(12) United States Patent
Mohamed et al.

(10) Patent No.: US 11,885,238 B2
(45) Date of Patent: Jan. 30, 2024

(54) TURBOCHARGER TURBINE WHEEL

(71) Applicant: Garrett Transportation I Inc., Torrance, CA (US)

(72) Inventors: Ashraf Mohamed, Torrance, CA (US); Denis Tisserant, Thaon-les-vosges (FR); Stephane Pees, Thaon-les-vosges (FR)

(73) Assignee: Garrett Transportation I Inc., Torrance, CA (US)

( * ) Notice: Subject to any disclaimer, the term of this patent is extended or adjusted under 35 U.S.C. 154(b) by 0 days.

(21) Appl. No.: 17/541,520

(22) Filed: Dec. 3, 2021

(65) Prior Publication Data
US 2023/0175406 A1 Jun. 8, 2023

(51) Int. Cl.
*F01D 5/22* (2006.01)
*F01D 5/14* (2006.01)
(Continued)

(52) U.S. Cl.
CPC ............ *F01D 5/225* (2013.01); *F01D 5/141* (2013.01); *F01D 5/147* (2013.01);
(Continued)

(58) Field of Classification Search
CPC .......... F05D 2220/40; F05D 2260/941; F05D 2240/30; F05D 2250/14; F05D 2250/70; F05D 2250/293; F05D 2250/71; F05D 2250/713; F05D 2240/24; F05D 2240/127; F05D 2250/60; F01D 5/048; F01D 5/141; F01D 5/147; F01D 5/027; F01D 5/225;
(Continued)

(56) References Cited

U.S. PATENT DOCUMENTS

| | | | |
|---|---|---|---|
| 7,484,935 B2 | 2/2009 | Heitland et al. | |
| 7,771,170 B2 * | 8/2010 | Seiler | F01D 5/048 |
| | | | 416/182 |

(Continued)

FOREIGN PATENT DOCUMENTS

| | | |
|---|---|---|
| EP | 3 771 802 A1 | 2/2021 |
| WO | 2013 162874 A1 | 10/2013 |

OTHER PUBLICATIONS

EP Appl. No. 22 18 8551, EPO Extended Examination Report dated Apr. 25, 2023 (6 pages).

*Primary Examiner* — Eric J Zamora Alvarez
(74) *Attorney, Agent, or Firm* — Brian J. Pangrle

(57) ABSTRACT

A turbocharger turbine wheel can include a hub that includes a rotational axis, a backdisk and a nose, where the rotational axis defines an axial coordinate (z) in a cylindrical coordinate system that includes a radial coordinate (r) and an azimuthal coordinate (Θ) in a direction of intended rotation about the rotational axis; and blades that extend outwardly from the hub, where each of the blades includes a hub profile, a shroud edge, a leading edge, a trailing edge, a pressure side, and a suction side, where the hub profile includes a global maximum radius and a global minimum radius, and where, between the global maximum radius and the global minimum radius, in an axial direction from the backdisk to the nose, the hub profile includes a local minimum radius at a first axial coordinate position and a local maximum radius at a second axial coordinate position.

19 Claims, 12 Drawing Sheets

(51) Int. Cl.
*F01D 5/04* (2006.01)
*F02C 6/12* (2006.01)

(52) U.S. Cl.
CPC ...... *F05D 2220/40* (2013.01); *F05D 2240/24* (2013.01); *F05D 2240/30* (2013.01)

(58) Field of Classification Search
CPC ... F01D 5/02; F01D 5/026; F01D 5/14; F01D 5/143; F01D 5/025; F01D 5/34; F04D 29/284; F04D 29/662; F04D 17/025; F04D 25/045; F04D 29/162; F04D 29/666; F04D 29/685; F02B 37/00; F02C 6/12
See application file for complete search history.

(56) References Cited

U.S. PATENT DOCUMENTS

| | | | |
|---|---|---|---|
| 9,988,907 B2* | 6/2018 | Xu | F01D 5/141 |
| 2004/0115044 A1 | 6/2004 | Osako et al. | |
| 2015/0086395 A1* | 3/2015 | Dextraze | F04D 17/10 |
| | | | 416/192 |
| 2019/0112927 A1* | 4/2019 | Yellapragada | F01D 5/34 |

* cited by examiner

TURBOCHARGER TURBINE WHEEL

TECHNICAL FIELD

Subject matter disclosed herein relates generally to turbocharger turbine wheels for internal combustion engines.

BACKGROUND

A turbocharger can include a rotating group that includes a turbine wheel and a compressor wheel that are connected to one another by a shaft. For example, a turbine wheel can be welded or otherwise connected to a shaft to form a shaft and wheel assembly (SWA) and a compressor wheel can be fit to the free end of the shaft. As an example, a shaft that is attached to one or more bladed wheels may be supported by one or more bearings disposed in a bearing housing, which may form a center housing rotating assembly (CHRA). During operation of a turbocharger, depending on factors such as size of various components, a SWA may be expected to rotate at speeds in excess of 200,000 rpm.

BRIEF DESCRIPTION OF THE DRAWINGS

A more complete understanding of the various methods, devices, assemblies, systems, arrangements, etc., described herein, and equivalents thereof, may be had by reference to the following detailed description when taken in conjunction with examples shown in the accompanying drawings where.

DETAILED DESCRIPTION

Below, an example of a turbocharged engine system is described followed by various examples of components, assemblies, methods, etc.

Figure 1:
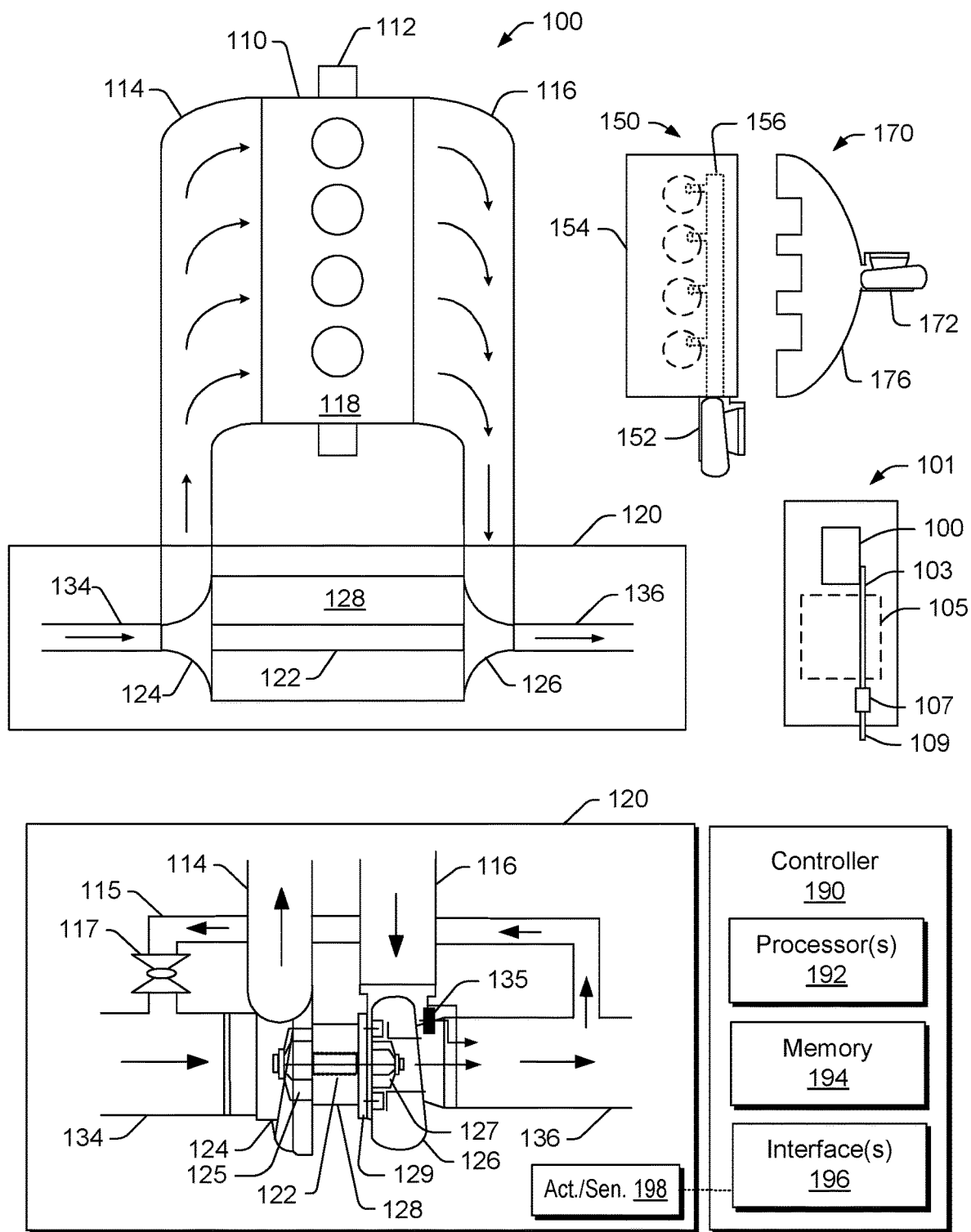
FIG. 1 is a diagram of a turbocharger and an internal combustion engine along with a controller.

Turbochargers are frequently utilized to increase output of an internal combustion engine. Referring to FIG. 1, as an example, a system 100 can include an internal combustion engine 110 and a turbocharger 120. As shown in FIG. 1, the system 100 may be part of a vehicle 101 where the system 100 is disposed in an engine compartment and connected to an exhaust conduit 103 that directs exhaust to an exhaust outlet 109, for example, located behind a passenger compartment 105. In the example of FIG. 1, a treatment unit 107 may be provided to treat exhaust (e.g., to reduce emissions via catalytic conversion of molecules, etc.).

As shown in FIG. 1, the internal combustion engine 110 includes an engine block 118 housing one or more combustion chambers that operatively drive a shaft 112 (e.g., via pistons) as well as an intake port 114 that provides a flow path for air to the engine block 118 and an exhaust port 116 that provides a flow path for exhaust from the engine block 118.

The turbocharger 120 can act to extract energy from the exhaust and to provide energy to intake air, which may be combined with fuel to form combustion gas. As shown in FIG. 1, the turbocharger 120 includes an air inlet 134, a shaft 122, a compressor housing assembly 124 for a compressor wheel 125, a turbine housing assembly 126 for a turbine wheel 127, another housing assembly 128 and an exhaust outlet 136. The housing assembly 128 may be referred to as a center housing assembly as it is disposed between the compressor housing assembly 124 and the turbine housing assembly 126.

In the turbocharger 120 of FIG. 1, the shaft 122 may be a shaft assembly that includes a variety of components (e.g., consider a shaft and wheel assembly (SWA) where the turbine wheel 127 is welded to the shaft 122, etc.). As an example, the shaft 122 may be rotatably supported by a bearing system (e.g., journal bearing(s), rolling element bearing(s), etc.) disposed in the housing assembly 128 (e.g., in a bore defined by one or more bore walls) such that rotation of the turbine wheel 127 causes rotation of the compressor wheel 125 (e.g., as rotatably coupled by the shaft 122). As an example a center housing rotating assembly (CHRA) can include the compressor wheel 125, the turbine wheel 127, the shaft 122, the housing assembly 128 and various other components (e.g., a compressor side plate disposed at an axial location between the compressor wheel 125 and the housing assembly 128).

In the example of FIG. 1, a variable geometry assembly 129 is shown as being, in part, disposed between the housing assembly 128 and the housing assembly 126. Such a variable geometry assembly may include vanes or other components to vary geometry of passages that lead to a turbine wheel space in the turbine housing assembly 126. As an example, a variable geometry compressor assembly may be provided.

In the example of FIG. 1, a wastegate valve (or simply wastegate) 135 is positioned proximate to an exhaust inlet of the turbine housing assembly 126. The wastegate valve 135 can be controlled to allow at least some exhaust from the exhaust port 116 to bypass the turbine wheel 127. Various wastegates, wastegate components, etc., may be applied to a conventional fixed nozzle turbine, a fixed-vaned nozzle turbine, a variable nozzle turbine, a twin scroll turbocharger, etc. As an example, a wastegate may be an internal wastegate (e.g., at least partially internal to a turbine housing). As an example, a wastegate may be an external wastegate (e.g., operatively coupled to a conduit in fluid communication with a turbine housing).

In the example of FIG. 1, an exhaust gas recirculation (EGR) conduit 115 is also shown, which may be provided, optionally with one or more valves 117, for example, to allow exhaust to flow to a position upstream the compressor wheel 125.

FIG. 1 also shows an example arrangement 150 for flow of exhaust to an exhaust turbine housing assembly 152 and another example arrangement 170 for flow of exhaust to an exhaust turbine housing assembly 172. In the arrangement 150, a cylinder head 154 includes passages 156 within to direct exhaust from cylinders to the turbine housing assembly 152 while in the arrangement 170, a manifold 176 provides for mounting of the turbine housing assembly 172, for example, without any separate, intermediate length of exhaust piping. In the example arrangements 150 and 170, the turbine housing assemblies 152 and 172 may be configured for use with a wastegate, variable geometry assembly, etc.

In FIG. 1, an example of a controller 190 is shown as including one or more processors 192, memory 194 and one or more interfaces 196. Such a controller may include circuitry such as circuitry of an engine control unit (ECU). As described herein, various methods or techniques may optionally be implemented in conjunction with a controller, for example, through control logic. Control logic may depend on one or more engine operating conditions (e.g., turbo rpm, engine rpm, temperature, load, lubricant, cooling, etc.). For example, sensors may transmit information to the controller 190 via the one or more interfaces 196. Control logic may rely on such information and, in turn, the controller 190 may output control signals to control engine operation. The controller 190 may be configured to control lubricant flow, temperature, a variable geometry assembly (e.g., variable geometry compressor or turbine), a wastegate (e.g., via an actuator), an electric motor, or one or more other components associated with an engine, a turbocharger (or turbochargers), etc. As an example, the turbocharger 120 may include one or more actuators and/or one or more sensors 198 that may be, for example, coupled to an interface or interfaces 196 of the controller 190. As an example, the wastegate 135 may be controlled by a controller that includes an actuator responsive to an electrical signal, a pressure signal, etc. As an example, an actuator for a wastegate may be a mechanical actuator, for example, that may operate without a need for electrical power (e.g., consider a mechanical actuator configured to respond to a pressure signal supplied via a conduit).

Figure 2:
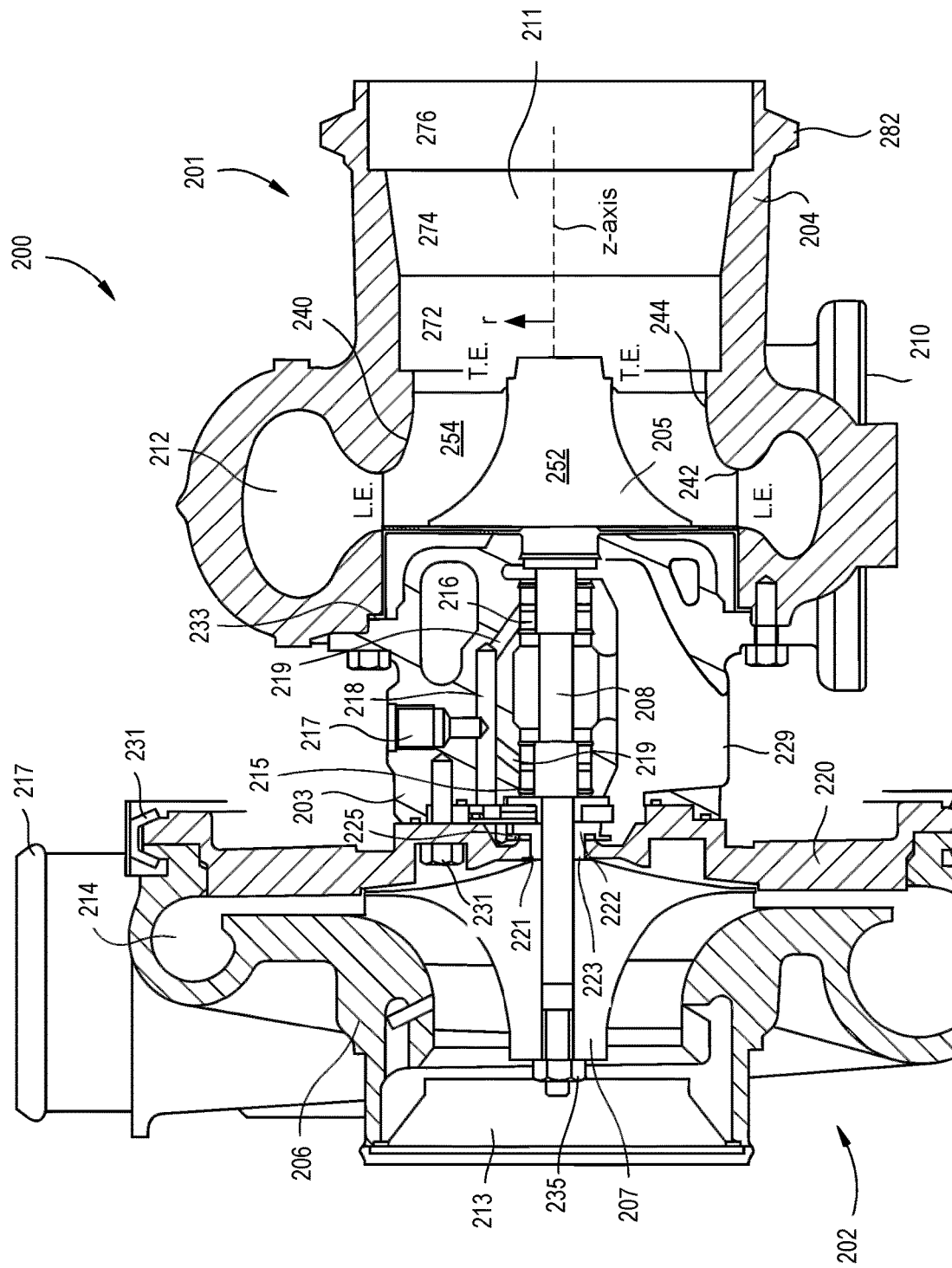
FIG. 2 is a cross-sectional view of an example of a turbocharger.

FIG. 2 shows an example of a turbocharger 200 that includes a turbine assembly 201, a compressor assembly 202 and a center housing 203. The turbine assembly 201 includes a turbine housing 204 that is shaped to accommodate a turbine wheel 205 and the compressor assembly 202 includes a compressor housing 206 that is shaped to accommodate a compressor wheel 207. As shown, a shaft 208 operatively couples the turbine wheel 205 and the compressor wheel 207 as supported by one or more bearings 215 and 216 in a through bore of the center housing 203.

As shown in FIG. 2, the turbine housing 204 can include an exhaust inlet 210 and an exhaust outlet 211 where a volute 212 is defined at least in part by the turbine housing 204. The volute 212 can be referred to as a scroll that decreases in its cross-sectional diameter as it spirals inwardly toward a turbine wheel space that accommodates the turbine wheel 205.

As shown in FIG. 2, the compressor housing 206 can include an air inlet 213 and an air outlet 211 where a volute 214 is defined at least in part by the compressor housing 206. The volute 214 can be referred to as a scroll that increases in its cross-sectional diameter as it spirals outwardly from a compressor wheel space that accommodates the compressor wheel 207.

Disposed between the compressor housing 206 and the center housing 203 is a backplate 220, which includes a bore 221 that can receive a thrust collar 222, which can abut against a base end 223 of the compressor wheel 207. As shown, the thrust collar 222 can include a lubricant slinger 225 that extends radially outward, which can help to reduce undesirable flow of lubricant (e.g., to the compressor wheel space, etc.).

The center housing 203 includes various lubricant features such as a lubricant inlet 217, a lubricant bore 218, lubricant jets 219, and a lubricant drain 229. As shown, lubricant can be provided at the lubricant inlet 217 to flow to the lubricant bore 218 and to the lubricant jets 219, which include a compressor side jet for directing lubricant to the bearing 215 and a turbine side jet for directing lubricant to the bearing 216. Lubricant can carry heat energy away from the bearings 215 and 216 as they rotatably support the shaft 208 as the turbine wheel 205 is driven by flow of exhaust through the turbine housing 204.

As shown in the example of FIG. 2, the compressor housing 206 can be clipped to the backplate 220 via a clip 231, the backplate 220 can be bolted to the center housing 203 via bolt or bolts 232 and the center housing 203 can be bolted to the turbine housing 204 via a bolt or bolts 233; noting that various other techniques may be utilized to couple the components to form a turbocharger.

In the example of FIG. 2, one or more of the housings 203, 204 and 206 may be cast. For example, the turbine housing 204 may be cast from iron, steel, nickel alloy, etc. As an example, consider a Ni-Resist cast iron alloy with a sufficient amount of nickel to produce an austenitic structure. For example, consider nickel being present from approximately 12 percent by weight to approximately 40 percent by weight. As an example, an increased amount of nickel can provide for a reduced coefficient of thermal expansion (e.g., consider a minimum at approximately 35 percent by weight). However, increased nickel content can increase cost of an Ni-Resist material; noting that density tends to be relatively constant over a large range of nickel content (e.g., approximately 7.3 to 7.6 grams per cubic centimeter). The density of Ni-Resist material tends to be approximately 5 percent higher than for gray cast iron and approximately 15 percent lower than cast bronze alloys. As to machinability, Ni-Resist materials tend to be better than cast steels; noting that increased chromium content tends to decrease machinability due to increasing amounts of hard carbides. When compared to stainless steel (e.g., density of approximately 8 grams per cubic centimeter), Ni-Resist materials can be less costly and of lesser mass (e.g., lesser density).

Ni-Resist materials tend to exhibit suitable high temperature properties, which may be at rated to over 480 degrees C. (900 degrees F.). Ni-Resist materials can be suitable for turbocharges for diesel and gasoline internal combustion engines. As an example, a diesel engine can have exhaust that may be at about 860 degrees C. and, as an example, a gasoline engine can have exhaust that may be at about 1050 degrees C. Such exhaust can be received by a turbine assembly that includes a turbine housing made of a suitable material.

As shown, the turbine housing 204 may be a relatively large component when compared to the compressor housing 206 and the center housing 203 such that the mass of the turbine housing 204 contributes significantly to the mass of the turbocharger 200.

In the example of FIG. 2, various components of the turbocharger 200 may be defined with respect to a cylindrical coordinately system that includes a z-axis centered on a through bore of the center housing 203, which can coincide with the rotational axis of a rotating assembly that includes the turbine wheel 205, the compressor wheel 207 and the shaft 208. As mentioned, a turbine wheel may be welded to a shaft to form a shaft and wheel assembly (SWA) and a compressor wheel may be threaded onto an end of a shaft (e.g., a "boreless" compressor wheel) or have a through bore that receives a free end of the shaft where a nut or other suitable component is used to secure the compressor wheel to the shaft. In the example of FIG. 2, the turbine wheel 205 is welded to the shaft 208 and a nut 235 is used to secure the compressor wheel 207 to the shaft 208 and, hence, the turbine wheel 205.

In the example of FIG. 2, a clearance exists between blades 254 that extend from a hub 252 of the turbine wheel 205 and a shroud portion 240 of the turbine housing 204. As shown, the shroud portion 240, in the cross-sectional view is "J" shaped, which can define a body of rotation that has an annular ridge portion 242 and a cylindrical portion 244. As shown, the annular ridge portion 242 can define a nozzle for exhaust that flows from the volute 212 to the turbine wheel space at an inducer portion of the turbine wheel 205, which can be defined by leading edges where each of the blades 254 includes a leading edge (L.E.). As shown, the turbine wheel 205 also includes an exducer portion where each of the blades 254 includes a trailing edge (T.E.). During operation, exhaust flows from the volute 212 via the nozzle defined in part by the annular ridge portion 242 of the shroud portion 240 to the leading edges of the blades 254, along channels defined by adjacent blades 254 of the turbine wheel 205 as confined between the hub 252 and the cylindrical portion 244 of the shroud portion 240 and then to the trailing edges of the blades 254 where the exhaust is confined by a larger diameter cylindrical wall 272, a slightly conical wall 274 and a yet larger diameter cylindrical wall 276. As shown in FIG. 2, the cylindrical wall 276 can be defined by a portion of the turbine housing 204 that includes a fitting such as an annular ridge 282 that can be utilized to secure an exhaust conduit to the turbine housing 204. Such an exhaust conduit may be in fluid communication with one or more other components such as an exhaust treatment unit, a muffler, another turbocharger, etc. As to the exhaust inlet 210 of the turbine housing 204, it too may be shaped to couple to one or more exhaust conduits such as, for example, an exhaust header, an exhaust manifold, another turbine housing (e.g., for a multi-stage turbocharger arrangement), etc.

As shown in FIG. 2, the turbine housing 204 severs various functions through its structural features and shapes thereof; however, such structural features can contribute to mass of the turbocharger.

As an example, a turbocharger may weigh from approximately 4 kilograms (e.g., 8.8 lbs) to approximately 40 kilograms (e.g., 88 lbs) or more.

As mentioned, a turbocharger can be defined with respect to a cylindrical coordinate system where a z-axis may be along a length. In the example of FIG. 2, the length of the turbine housing 204 is over 50 percent of the total length. The overall length or size of a turbocharger can be a factor when installing in an engine compartment of a vehicle as it presents design constraints.

As an example, a turbocharger can include a turbine assembly with particular features that can improve performance and reduce mass and/or size of a turbocharger. For example, consider a turbine wheel that includes a conical region that is disposed between the leading edges and the trailing edges of the blades of the turbine wheel. For example, in FIG. 2, the shroud portion 240 and blades 254 have a cylindrical shape as identified by the cylindrical portion 244. In contrast, an example turbine assembly can include a shroud portion of a turbine housing and blades of a turbine wheel that include a conical shape that provides for a reduction in axial length of the turbine wheel or a lesser axial distance between a tip of a leading edge of a blade and a tip of a trailing edge of the blade. With a turbine wheel that includes a conical shape, a turbine housing may be made smaller and hence contribute to a reduction in length and/or mass of a turbocharger, which can translate into benefits for a vehicle that includes one or more of such turbochargers (e.g., lesser mass, lesser thermal mass to cool, faster cooling, more flexibility in arrangement in an engine compartment, a smaller engine compartment, etc.).

Additionally, or alternatively, performance can be improved by use of blades that include a conical portion where a turbine housing can include a shroud portion that includes a similar, matching conical portion. With increased performance, benefits may be realized, for example, as to balances between size, mass and performance.

As an example, a turbine wheel with a conical portion can provide performance benefits that can result in a reduction in overall size and mass of a turbine housing. For example, consider a reduction in volute size such that material demands can be reduced. As shown in FIG. 2, the volute 212 is defined by the turbine housing 204, particularly by an annular wall that has a cross-sectional "C" shape. As an example, a reduction in turbine wheel outer diameter can allow for a reduction in the maximum radius of a turbine housing (e.g., to form a volute that has a maximum radius).

The turbocharger 200 of FIG. 2 can be cooled via one or more media, such as lubricant (e.g., oil), water (e.g., radiator fluid, etc.), and air (e.g., via an environment with ambient air or vehicle engine compartment air).

As to lubricant cooling (e.g., oil, whether natural, synthetic, etc.), some tradeoffs exists. For example, if a carbonaceous lubricant reaches too high of a temperature for too long of a time (e.g., consider a time-temperature dependence), carbonization (e.g., also known as coke formation or "coking"), may occur. Coking can exasperate heat generation and heat retention by any of a variety of mechanisms and, over time, coke deposits can shorten the lifetime of a lubricated bearing system. As an example, coke deposits may cause a reduction in heat transfer and an increase heat generation, which may lead to failure of the bearing system. To overcome coking, a turbocharger may be configured to improve lubricant flow. For example, a pump may pressurize lubricant to increase flow rates to reduce residence time of lubricant in high temperature regions. However, an increase in lubricant pressure can exasperate various types of lubricant leakage issues. For example, an increase in lubricant pressure of a bearing system can result in leakage of lubricant to an exhaust turbine, to an air compressor or both. Escape via an exhaust turbine can lead to observable levels of smoke while escape via an air compressor can lead to lubricant entering an intercooler, combustion chambers (e.g., combustion cylinders), etc.

As to temperatures experienced during operation, they can depend on temperature of exhaust flowing to an exhaust turbine of a turbocharger, which can depend on whether an internal combustion engine is gasoline or diesel fueled (e.g., as mentioned, a diesel engine may have exhaust at about 860 degrees C. and a gasoline engine may have exhaust at about 1050 degrees C.). Also, as to temperature, consider the example arrangements 150 and 170 of FIG. 1 where the turbine housing assemblies 152 and 172 are in close proximity to combustion cylinders, which may result in the turbine housing assemblies 152 and 172 experiencing higher exhaust temperatures and/or higher ambient temperatures.

Figure 3:
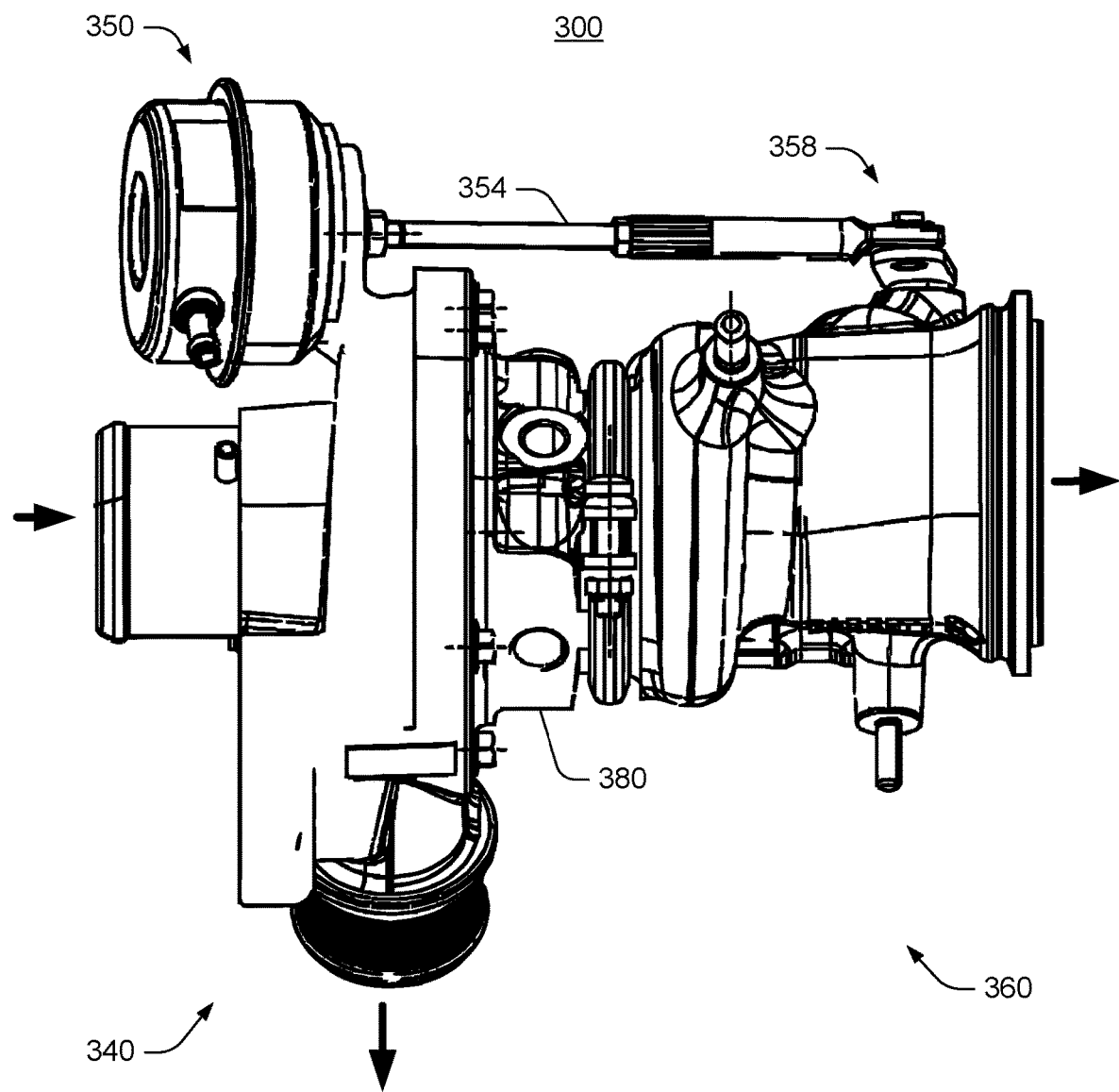
FIG. 3 is a side view of an example of a turbocharger.

FIG. 3 shows an example of a turbocharger 300 that includes a compressor assembly 340 with a compressor housing for a compressor wheel, a turbine assembly 360 with a turbine housing for a turbine wheel, a center housing 380 for a bearing, bearings or a bearing assembly to rotatably support a shaft of a shaft and wheel assembly (SWA), and an actuator 350 with a linkage 354 to a control arm assembly 358 for a wastegate of the turbine assembly 360. The turbocharger 300 can include one or more of the components shown in FIG. 2. In the view of FIG. 3, the exhaust inlet of the turbine assembly 360 is not visible because it is on the opposite side. General directions of flow of air or exhaust are indicated by arrows. The actuator 350 is shown as being mounted to the compressor assembly 340, which can help to reduce temperatures experienced by the actuator 350 (e.g., compared to having the actuator mounted on a turbine housing). The turbocharger 300 can be part of a vehicle such as, for example, the vehicle 101 of FIG. 1. As an example, the turbine assembly 360 may optionally be arranged such as in one of the example arrangements 150 or 170 of FIG. 1.

Figure 4:
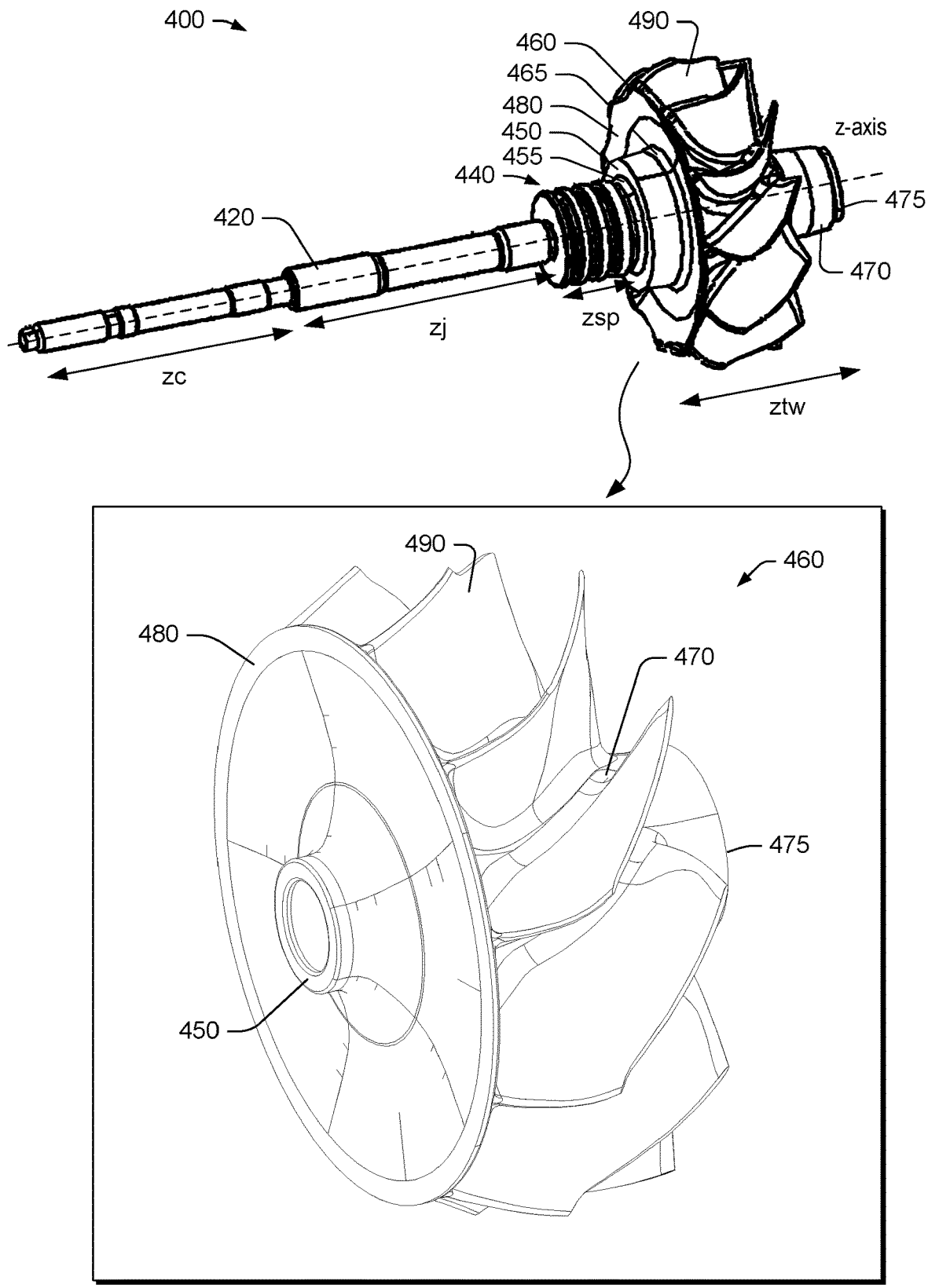
FIG. 4 is a perspective view and an enlarged view of an example of a shaft and wheel assembly (SWA)

FIG. 4 shows a perspective view of a shaft and wheel assembly (SWA) 400. As shown, the SWA 400 includes a shaft 420, a seal portion 440 and a turbine wheel 460 where the turbine wheel 460 includes a nose 470, a backdisk 480 and blades 490. The turbine wheel 460 can be a single, unitary piece of material and referred to as a single component or a single piece. A portion of the turbine wheel 460 can be referred to as a hub 465. For example, the backdisk 480 can be a part of the hub 465 from which the blades 490 extend. The hub 465 can include the backdisk 480 and the nose 470, which includes a nose end 475, and extend the length of the turbine wheel as indicated by an axial length ztw as measured along a rotational z-axis of the SWA 400.

As an example, the seal portion 440 can be formed in part by the turbine wheel 460 and in part by the shaft 420, can be formed by the shaft 420 or can be formed by the turbine wheel 460. As an example, the seal portion 440 can be formed at least in part by the shaft 420. The seal portion 440 can be defined by an outer radius. In FIG. 2, a seal portion is shown as disposed at least in part in a turbine side bore opening of the center housing 203 where one or more seal elements (e.g., rings, etc.) are disposed in one or more annular grooves of the seal portion and/or of a turbine side bore wall that defines the turbine side bore opening. With reference to FIG. 2, the seal portion can form a seal or seals between a lubricant region of the center housing 203 and an exhaust region in which the turbine wheel 205 is disposed.

As shown in FIG. 4, the SWA 400 can include a shoulder or step down from the turbine wheel 460 toward the shaft 420. For example, a shoulder can step down from an outer surface of the shaft joint portion 450 to an outer surface 455, which may be at a radius equal to or approximately equal to that of the seal portion 440. The shaft joint portion 450 can include a surface that is an annular axial face that can form a portion of a shoulder.

As an example, the shaft joint portion 450 can include a shaft joint surface that can be defined in part by a shaft joint radius. For example, consider a shaft joint surface that can be utilized to join a shaft to a turbine wheel (e.g., via welding, etc.). In such an example, the shaft joint surface of the turbine wheel can be a mating surface that mates with a turbine wheel joint surface of a shaft where the two surfaces can be brought into proximity or direct contact and joined (e.g., via welding). As an example, a shaft joint surface may be an annular surface that can be welded to a surface of a shaft to form a SWA (e.g., to form a weld or welds).

The SWA 400 can include dimensions such as, for example, axial dimensions for a compressor wheel portion zc, which may include one or more pilot surfaces, a set of threads, etc., and a bearing portion zj, which may include one or more journal surfaces (e.g., a compressor side journal surface and a turbine side journal surface, etc.).

As shown in FIG. 4, the seal portion 440 can include one or more annular grooves that may be configured to receive one or more seal elements (e.g., one or more seal rings). As shown, the seal portion 440 can be defined in part by an axial dimension zsp. As an example, a seal element can be a split ring such as, for example, a piston ring. As mentioned, a SWA may be formed by welding a shaft to a turbine wheel such that the resulting SWA has a shaft and a turbine wheel arranged and fixed along a common rotational axis.

FIG. 4 shows an enlarged perspective view of a portion of the SWA 400, specifically the turbine wheel 460. As an example, a turbine wheel may be defined using diameters, which can be circles that inscribe features of the turbine wheel. For example, where a turbine wheel includes an odd number of blades, a diameter as a line may not be drawn from a leading edge of one blade to a leading edge of another blade. In such an example, diameter can be defined via a circle that inscribes the leading edges of the blades or, for example, mathematically, as twice a radius. A turbine wheel may be defined by an inducer diameter (e.g., associated with exhaust inflow) and an exducer diameter (e.g., associated with exhaust outflow). As an example, an inducer diameter can exceed an exducer diameter. As an example, a trim of a turbine wheel can be defined using its inducer diameter and its exducer diameter. Where diameter is mentioned, it may refer to a diameter of a circle that can be drawn with respect to features of a turbine wheel. As an example, a turbine wheel may be defined in a cylindrical coordinate system that includes axial, radial and azimuthal coordinates (e.g., r, z, and Θ).

As an example, a balancing process may alter one or more dimensions of a turbine wheel, for example, via removal of material. For example, consider removal of material from the nose 470 of the turbine wheel 460 of the SWA 400. As shown, the nose 470 has an outer diameter that is less than an outer diameter of the backdisk 480. Another option can be to remove material from the backdisk 480. As an example, material may be removed from the shaft joint portion 450. In such an example, material removal may have minimal impact on the backdisk 480 as to its ability to support the blades 490.

As shown in the example of FIG. 4, an exhaust turbocharger turbine wheel 460 can include the hub 465 that includes the nose 470, the backdisk 480, a shaft joint portion 450 (e.g., as part of the backdisk 480) and a rotational axis (z-axis); the blades 490 that extend from the hub 465 to define exhaust flow channels where each of the blades 490 includes a leading edge (L.E.), a trailing edge (T.E.), a hub profile, a shroud profile defined by a shroud edge (S.E.), a pressure side (P.S.), and a suction side (S.S.); where the backdisk 480 includes an outer perimeter radius measured from the rotational axis of the hub 465 and an intermediate radius at an outer perimeter of the shaft joint portion 450 measured from the rotational axis of the hub 465.

As to the shaft joint portion 450, it is shown as being substantially cylindrical. As an example, the backdisk 480 can be defined as a lower portion of the hub 465 that includes at least part of the shaft joint portion 450 and that extends outwardly to a maximum outer perimeter of the backdisk 480.

As explained, the shaft joint portion 450 can join the seal portion 440, which may be an integral part of the shaft 420. As an example, the seal portion 440 can be welded to the shaft joint portion 450 to form a welded joint that is to permanently join the shaft 420 and the turbine wheel 460 to form the shaft and wheel assembly (SWA) 400.

As an example, a shaft may be made of a material that is the same as that of a turbine wheel or that is different from that of a turbine wheel. Where materials differ, the materials can generally be amenable to welding such that a SWA can be formed. As an example, a compressor wheel may be manufactured from a material that has a lesser specific gravity than a material of a turbine wheel. In general, a compressor wheel experiences operational temperatures that are less than those of a turbine wheel. As an example, a turbine wheel can be made of a nickel alloy. For example, consider a NiCrFe-based alloy (e.g., HASTALLOY™ material, INCONEL™ material, etc.) or another alloy. In contrast, a compressor wheel may be made of a lighter material such as, for example, aluminum or an aluminum alloy. A turbine wheel material may have a specific gravity that is double or more than double that of aluminum (approximately 2.7 versus approximately 8.4 for INCONEL™ 625 material).

A rotating assembly can have a mass defined by a sum of individual masses of components that make up the rotating assembly (see, e.g., FIG. 2 where a rotating assembly includes the turbine wheel 205, the compressor wheel 207 and the shaft 208). As mentioned, flow of exhaust to an exhaust turbine disposed in a turbine housing can be a driver for rotation of a rotating assembly where mass and other factors can determine how much exhaust must flow before rotation commences.

Figure 5:
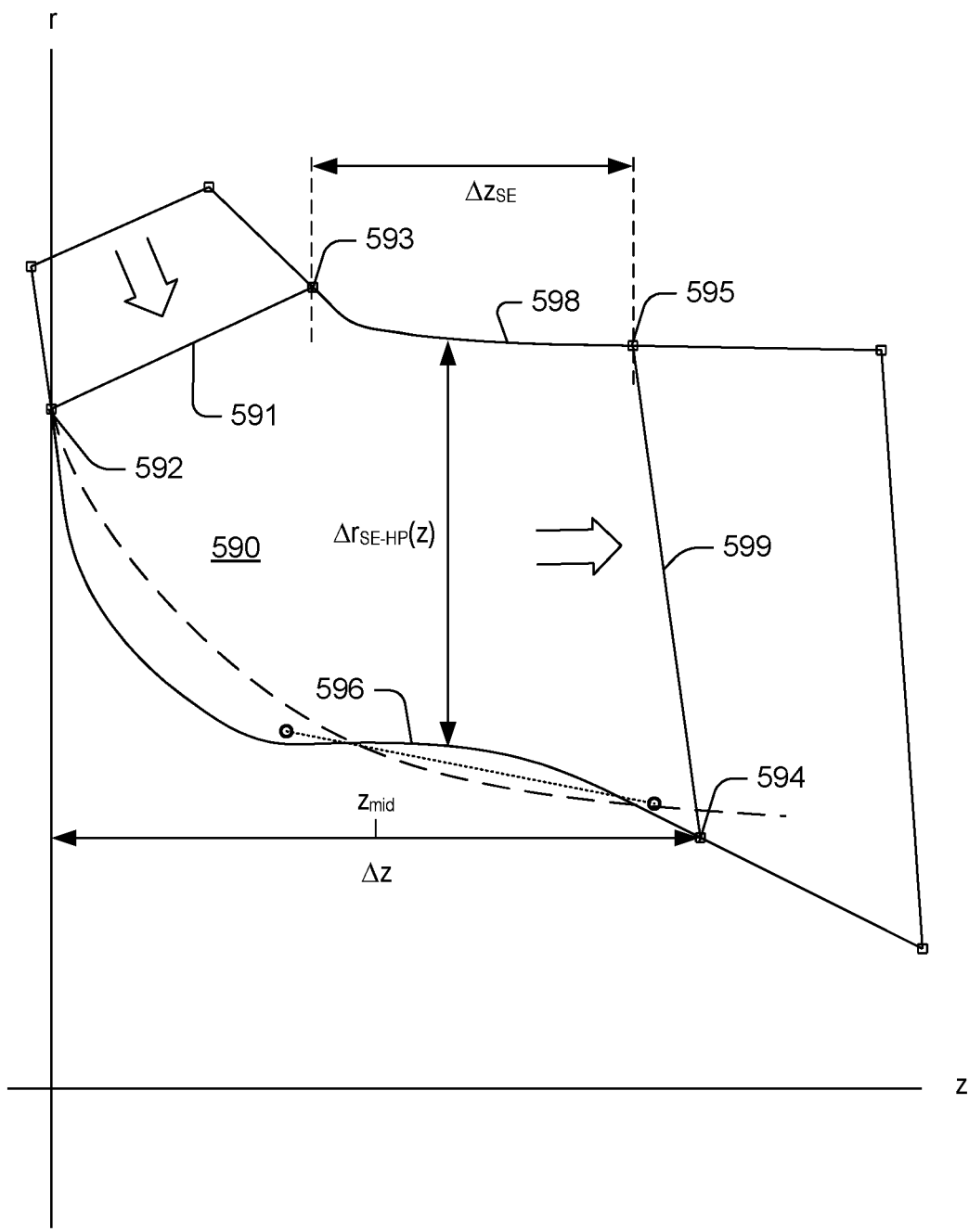
FIG. 5 is a projected view of an example of a blade of a turbine wheel.

FIG. 5 shows a representation of an example of a blade 590 of a turbine wheel with respect to a r, z coordinate system where r is a radial coordinate and z is an axial coordinate where the z-axis is aligned with the rotational axis of the turbine wheel. As shown in the example of FIG. 5, the blade 590 includes various blade features such as a leading edge 591 (or inducer edge), a trailing edge 599 (or an exducer edge), a backdisk point 592 of the leading edge 591, a tip point 593 of the leading edge 591, a hub point 594 of the trailing edge 599, a tip point 595 of the trailing edge 599, a hub profile 596 that extends from the leading edge 591 to the trailing edge 599, and a shroud edge 598 (e.g., a shroud profile) that extends from the leading edge 591 to the trailing edge 599. As shown, the r-axis is orthogonal to the z-axis and at a z coordinate that corresponds to the backdisk point 592 of the leading edge 591. Various points of the blade 590 can be described using the r, z coordinate system. In FIG. 5, the blade 590 can be defined with respect to radial and axial coordinates. As an example, a polar angle plot may be utilized to provide for additional information that defines the blade 590. For example, consider a plot of wrap angle along a camber line. As an example, the blade 590 may be defined using one or more equations, parameters, etc., of an airfoil or an impeller.

A turbine wheel can include a blade outer diameter at the tip point 593 of the leading edge 591 (e.g., inducer edge); another blade outer diameter at the tip point 595 of the trailing edge 599 (e.g., exducer edge); and a blade diameter at the hub point 594 at the trailing edge 599 (e.g., exducer edge).

As mentioned, a circle may inscribe blade features to define a diameter. As an example, a diameter Die (diameter leading edge) and a diameter $D_{te}$ (diameter trailing edge) may not correspond to circles but rather correspond to a particular cross-section, where a circle would have a slightly larger diameter than $D_{le}$ and another circle would have a slightly larger diameter than $D_{te}$.

FIG. 5 also shows arrows that indicate intended direction of flow of exhaust, from the leading edge 591 to the trailing edge 599 where two adjacent blades define a flow channel for exhaust (e.g., an exhaust flow channel). As mentioned, one side of a blade can be defined as a pressure side while an opposing side of the blade can be defined as a suction side. The representation of FIG. 5 is a projected view such that the concave and convex shapes of the blade 590 as to pressure and suction sides are not seen.

As an example, a turbine wheel can be a radial flow turbine wheel (e.g., radial inlet flow) or can be a mixed-flow turbine wheel (e.g., mixed inlet flow) where an angle can define at least a portion of a leading edge such that incoming exhaust has both a radial component and an axial component. For a mixed-flow turbine wheel blade, a leading edge is at an angle other than 90 degrees with respect to the r-axis and is at an angle other than 0 degrees with respect to the z-axis (e.g., approximately 1 degree to approximately 89 degrees). As an example, a turbine wheel blade may be radially stacked or not radially stacked (e.g., non-radially stacked).

In the example of FIG. 5, the blade 590 is shown as having an axial height $\Delta z$, which corresponds to the axial height of the hub profile 596 and the blade is shown as having a shroud edge axial dimension $\Delta z_{SE}$ between the tip point 593 of the leading edge 591 and the tip point 595 of the trailing edge 599. Over the axial span of the axial dimension $\Delta z_{SE}$, a radial dimension $\Delta r_{SE-HP}(z)$ can be defined, which includes a minimum radial dimension within the axial span that is not at the z coordinate of the tip point 593 or at the z coordinate of the tip point 595; rather, the minimum radial dimension is between the tip point 593 and the tip point 595.

In the example of FIG. 5, a dotted line is illustrated as extending between two points, illustrated as open circles. The dotted line indicates that the hub profile 596 of the blade 590 is concave from the perspective of the blade 590. Specifically, the dotted line intersects the hub profile multiple times (e.g., at least two times). As such, the portion of the blade 590 that is within the axial span of the shroud edge axial dimension $\Delta z_{SE}$ is not convex as the hub profile 596 provides concavity.

A hub of a turbine wheel that includes a set of blades such as a set of the blades 590 has a concavity as well. For example, consider drawing a line between two points in the hub as shown in FIG. 5 where a first point is within the range of the shroud edge axial dimension $\Delta z_{SE}$ and a second point is axially below the first point such that the line crosses the hub profile 596 multiple times.

In the example of FIG. 5, a corresponding turbine wheel hub may be considered to have a bulge where the radial dimension of the hub decreases and then increases for a range of increasing axial dimension. In the example of FIG. 5, the radial dimension decreases from a global maximum at the backdisk point 592 to a local minimum, increases to a local maximum, and then decreases to a global minimum. In the example of FIG. 5, the hub profile 596 can be defined similarly (e.g., from global maximum, to local minimum, to local maximum, to global minimum over the axial height $\Delta z$ of the blade 590).

As an example, a turbocharger turbine wheel can include a hub with a radial bulge between a backdisk of the hub and a nose of the hub. For example, the radial bulge may be span an axial mid-point of a blade as defined from an axial lowermost point on a leading edge of the blade to an axial uppermost point on a trailing edge of the blade. In the example of FIG. 5, an axial mid-point $z_{mid}$ is illustrated where a radial bulge spans the axial mid-point $z_{mid}$. As shown, the radial bulge is offset an axial distance from the axial lowermost point, the backdisk point 592, on the leading edge 591 of the blade 590. As an example, a turbine wheel may include a leading edge that extends freely away from a backdisk such that an axial lowermost point on the leading edge is lower than a backdisk point. As an example, a radial bulge may commence at or otherwise span an axial mid-point.

As an example, a radial bulge may be defined by an axial dimension such as an axial span where the axial span may be offset away from an axial lowermost point of a leading edge of a blade and toward an axial uppermost point of a trailing edge of the blade. As shown in the example of FIG. 5, the radial bulge is offset toward the trailing edge 599 of the blade 590. As an example, a blade may include a radial deficit region that is offset toward an axial lowermost point on a leading edge of the blade.

As an example, a turbine rotor can include a hub with a cambered hub contour that can be tailored for desired performance and longer life and durability, for example, with minimum possible mass and inertia. As explained with respect to the hub profile 596 of FIG. 5, a radial inlet or a mixed inlet (e.g., radial and axial) turbine rotor can include a hub cambered surface extending from a point at a leading edge to a point at a trailing edge. In such an example, performance and durability of the turbine rotor may increase or the mass and inertia of the rotor may decrease, for example, without a penalty on performance. As an example, an approach may aim to achieve a balance of increased performance and/or durability and mass and inertia. For example, consider an approach that aims to provide desired performance with minimal mass and inertia.

As an example, the hub profile 596 of FIG. 5 may be defined using one or more mathematical terms. As an example, a parametric curve may be utilized to define at least a portion of a hub profile. A parametric curve can be defined in part by continuity in terms of differentiability. For example, $C^0$ continuity means that a curve is connected at joints, $C^1$ continuity means that a curve is connected as segments that share a common first derivative at a joint, and $C^n$ continuity means that segments share the same nth derivative at a joint. As an example, a hub profile may be represented by a parametric curve that has greater than $C^0$ continuity. As an example, a hub profile may be represented by a parametric polynomial curve. As an example, one or more splines may be utilized to define a hub profile and/or one or more blending functions may be utilized to define a hub profile. As to splines, some examples include Hermite, Bezier, Catmull-Rom and B-Spline. As an example, a hub profile may be represented using control points, which may be joints. For example, the hub profile 596 may be represented using approximately 20 control points (e.g., consider 21 control points, etc.) in a r,z-plane that may be evenly spaced along the hub profile 596 to define a number of segments where the segments can have greater than $C^0$ continuity at the control points (e.g., joints). In such an example, one or more splines may be utilized to define the hub profile 596.

Figure 6A:
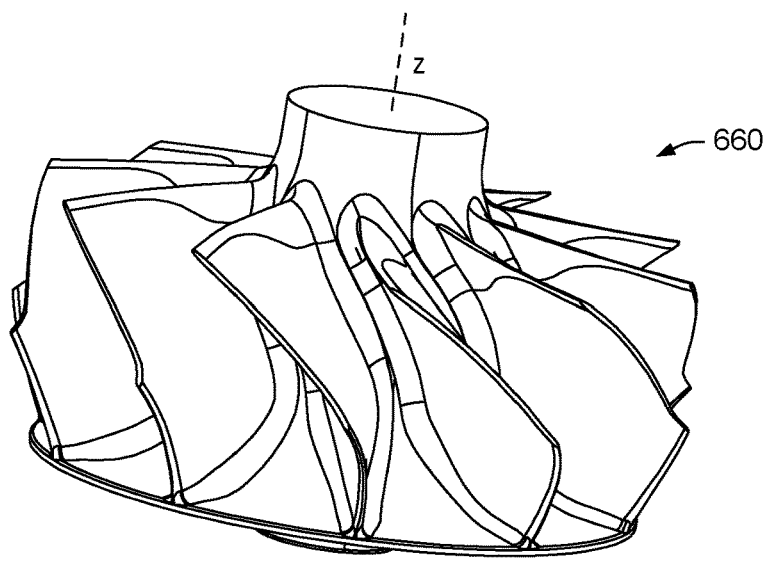
FIGS. 6A, 6B and 6C is a series of views of an example of a turbine wheels.
Figure 6B:
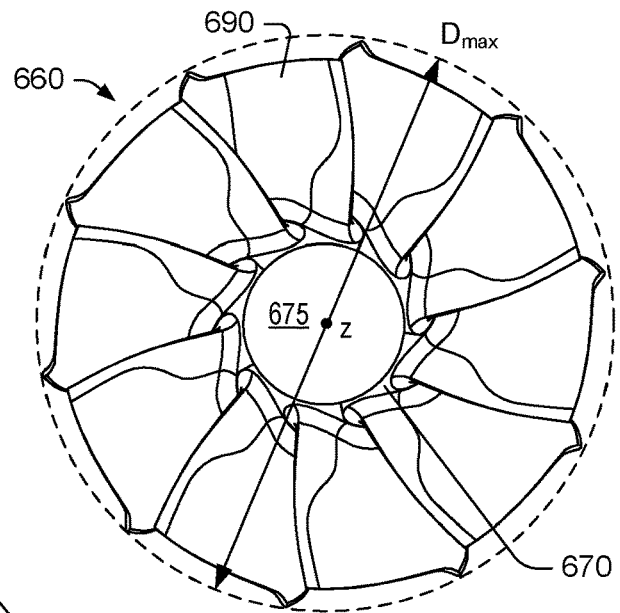
Figure 6C:
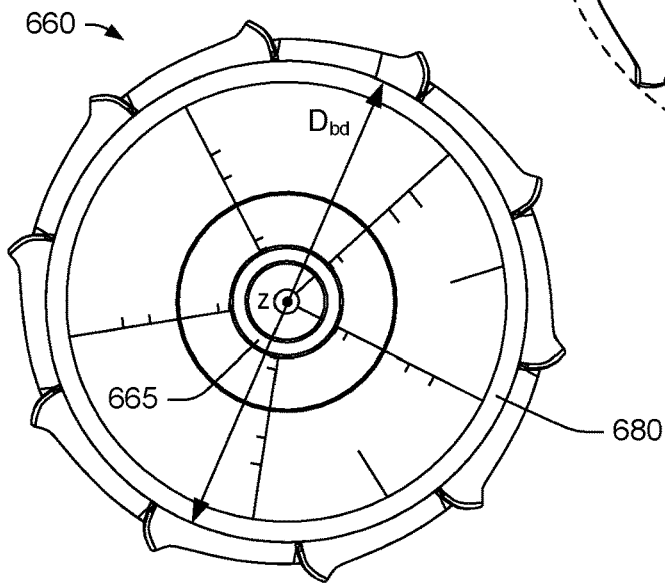

FIG. 6A, FIG. 6B and FIG. 6C show perspective, top and bottom views of an example of a turbine wheel 660 (e.g., a turbine rotor), respectively. As shown, the turbine wheel 660 includes a shaft joint portion 665, a hub 670 with a nose 575, a backdisk 680 and a plurality of blades 690. In such an example, the hub 670 of the turbine wheel 660 can be contoured to include a profile as shown as the hub profile 596 in FIG. 5 where each of the plurality of blades 690 can be shaped as the blade 590 of FIG. 5.

As shown, the turbine wheel 660 can be defined by a maximum diameter $D_{max}$ via the plurality of blades 690 where the backdisk 680 can be of a lesser diameter $D_{bd}$.

Figure 7:
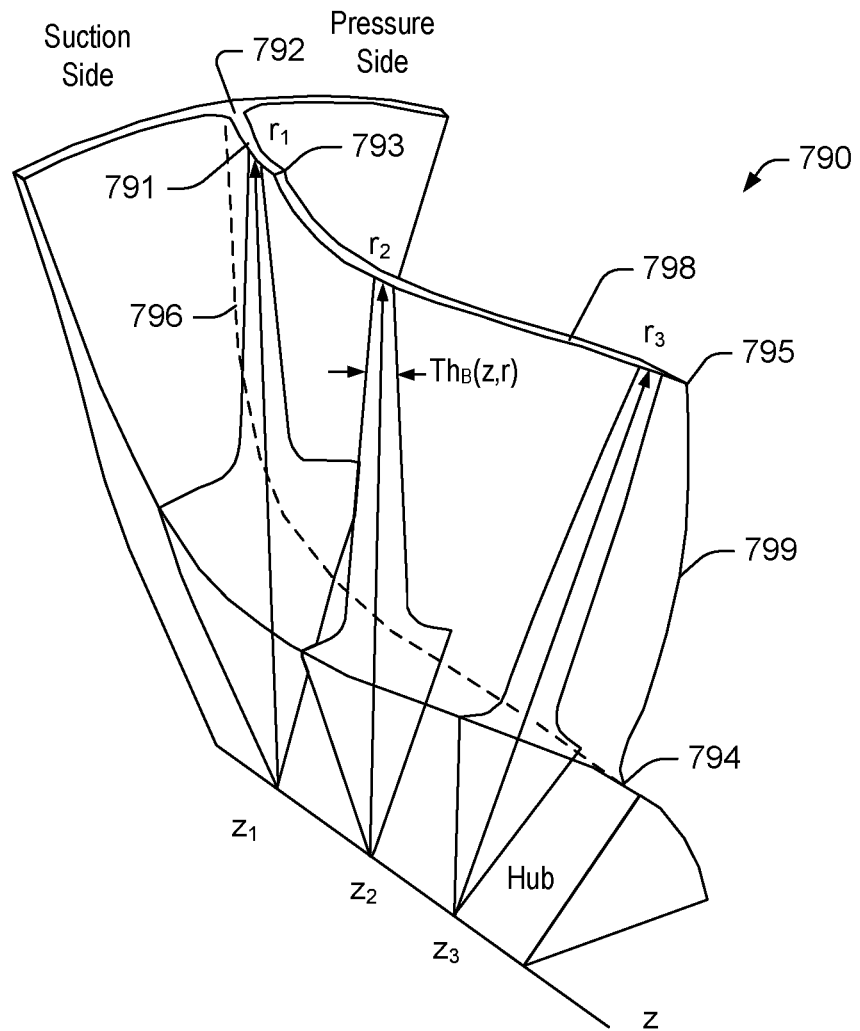
FIG. 7 is a view of a portion of an example of a turbine wheel.

FIG. 7 shows an example of a blade 790 as a section of a turbine wheel that includes a plurality of blades. As shown, the blade 790 includes a leading edge 791, a hub profile 796, a shroud profile 798, a trailing edge 799 and various points 792, 793, 794 and 795, which may be defined in a cylindrical coordinate system. In the example blade 790 of FIG. 7, three radial lines are shown, labeled $r_1$, $r_2$ and $r_3$, which have corresponding axial coordinates $z_1$, $z_2$ and $z_3$, where each of the three radial lines may be referred to as a radial fiber. In FIG. 7, at three different r, $\Theta$ planes at $z_1$, $z_2$ and $z_3$, cross-sectional areas and shapes of the hub and the blade 790 are illustrated. As an example, a blade can be defined in part by a thickness, which can be shown as the thickness $Th_B(z,r)$ at a particular axial dimension and a particular radial dimension. A blade thickness can be a distance that is between a pressure surface (e.g., a pressure side) and a suction surface (e.g., a suction side) of a blade. In the example of FIG. 7, the blade 790 can have a thickness that various in different regions. As an example, a blade may be thinner at a shroud edge (e.g., along a shroud profile) and thicker at a hub edge (e.g., along a hub profile). As shown in FIG. 7, the hub can vary in its radius where the hub can have a smaller radius near a nose and a larger radius near a base (e.g., where the blade 790 joins the backdisk).

In the example of FIG. 7, the hub profile 796 differs from the hub profile 596 of the blade 590 of FIG. 5. In particular, the hub profile 796 with respect to the blade 790 may be referred to as being convex, without concavity as illustrated by the hub profile 596 with respect to the blade 590.

Figure 8:
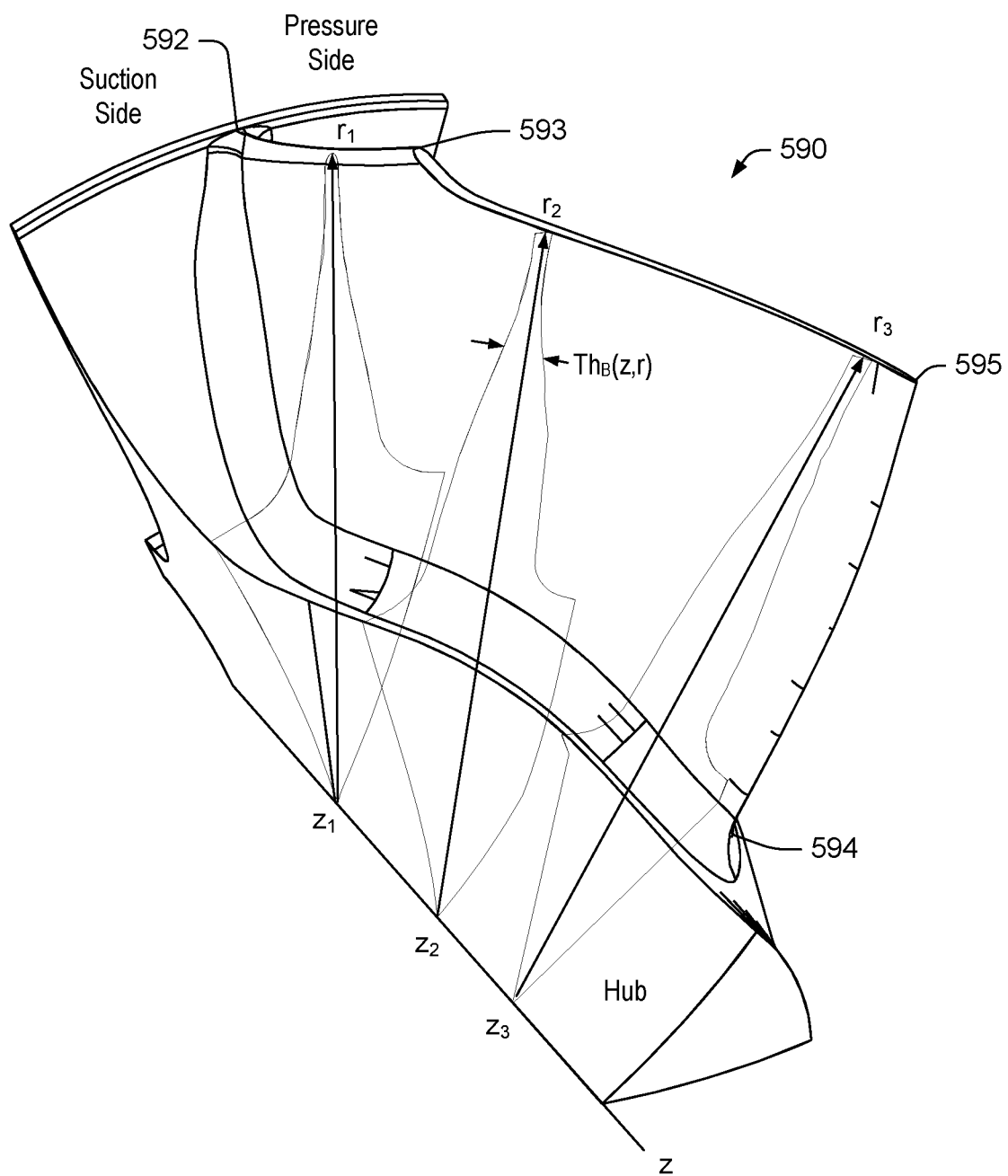
FIG. 8 is a view of a portion of an example of a turbine wheel.

FIG. 8 shows the blade 590 in a perspective view akin to the view of the blade 790 of FIG. 7 for purposes of comparison. As explained, the hub profile 596 of the blade 590 differs from the hub profile 796 of the blade 790. Various parameters described with respect to the blade 790 may be utilized to describe the blade 590. In particular, referring to FIG. 5, a radial dimension from the hub profile 596 to the shroud edge 598 may be utilized in combination with radial and/or axial coordinates, dimensions, etc. (see, e.g., $r_1$, $z_1$, $r_2$, $z_2$, $r_3$, $z_3$, etc.). As shown in FIG. 8, the middle cross-section at $z_2$ tends to have a thicker blade root for the blade 590 compared to the blade root cross-section at $z_2$ for the blade 790 of FIG. 7. As explained, two adjacent blades can define a channel or passage with a suction side and a pressure side. The shape of a channel or passage formed by two of the blades 790 differs from a channel or passage formed by two of the blades 590. For example, consider flow along a hub surface of the channel or passage where the blade 590 can provide for more axially directed flow due to the hub profile increasing in radius followed by an increase in radial flow due to the hub profile 596 decreasing in radius.

Figure 9:
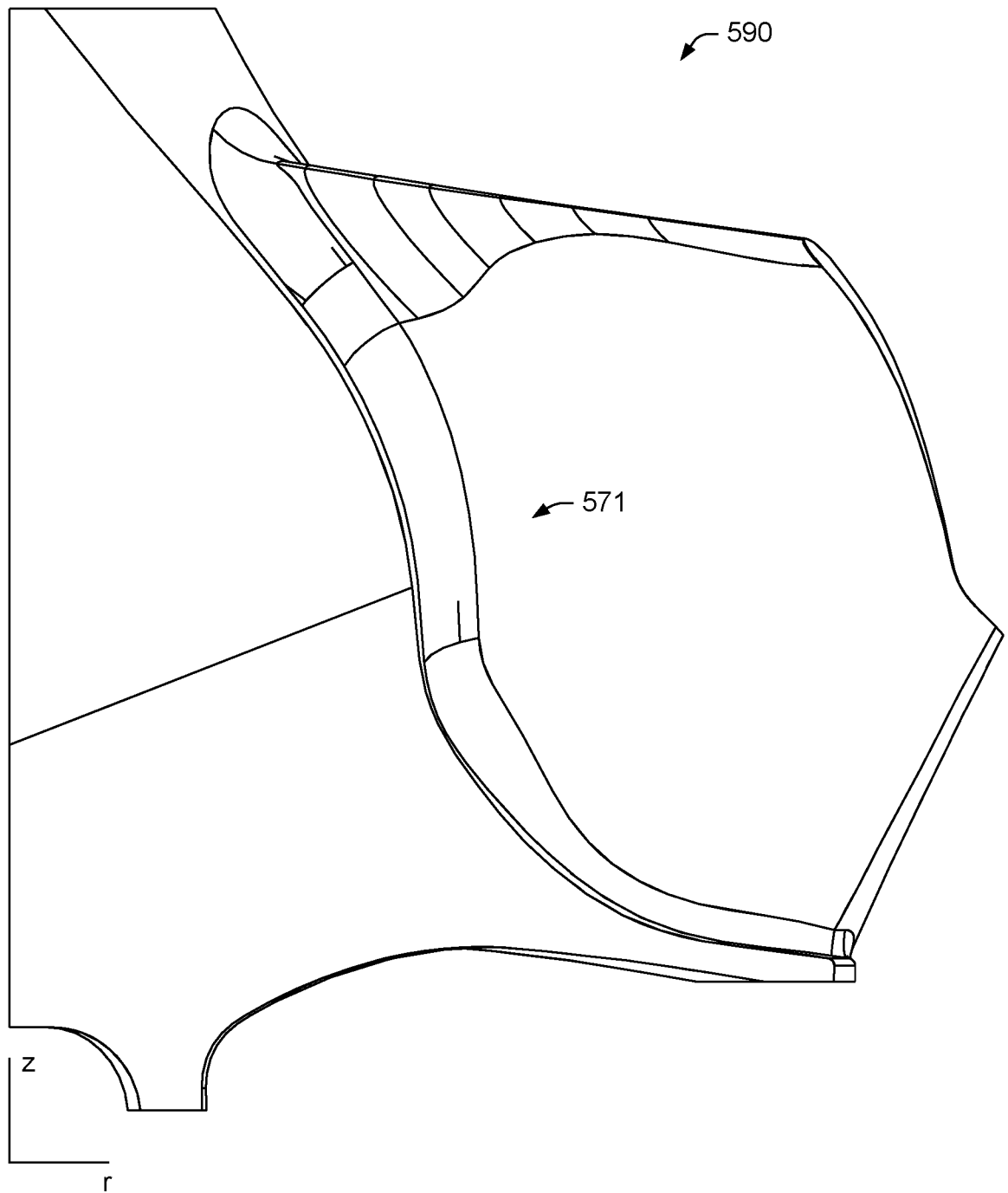
FIG. 9 is a side view of a portion of an example of a turbine wheel.
Figure 10:
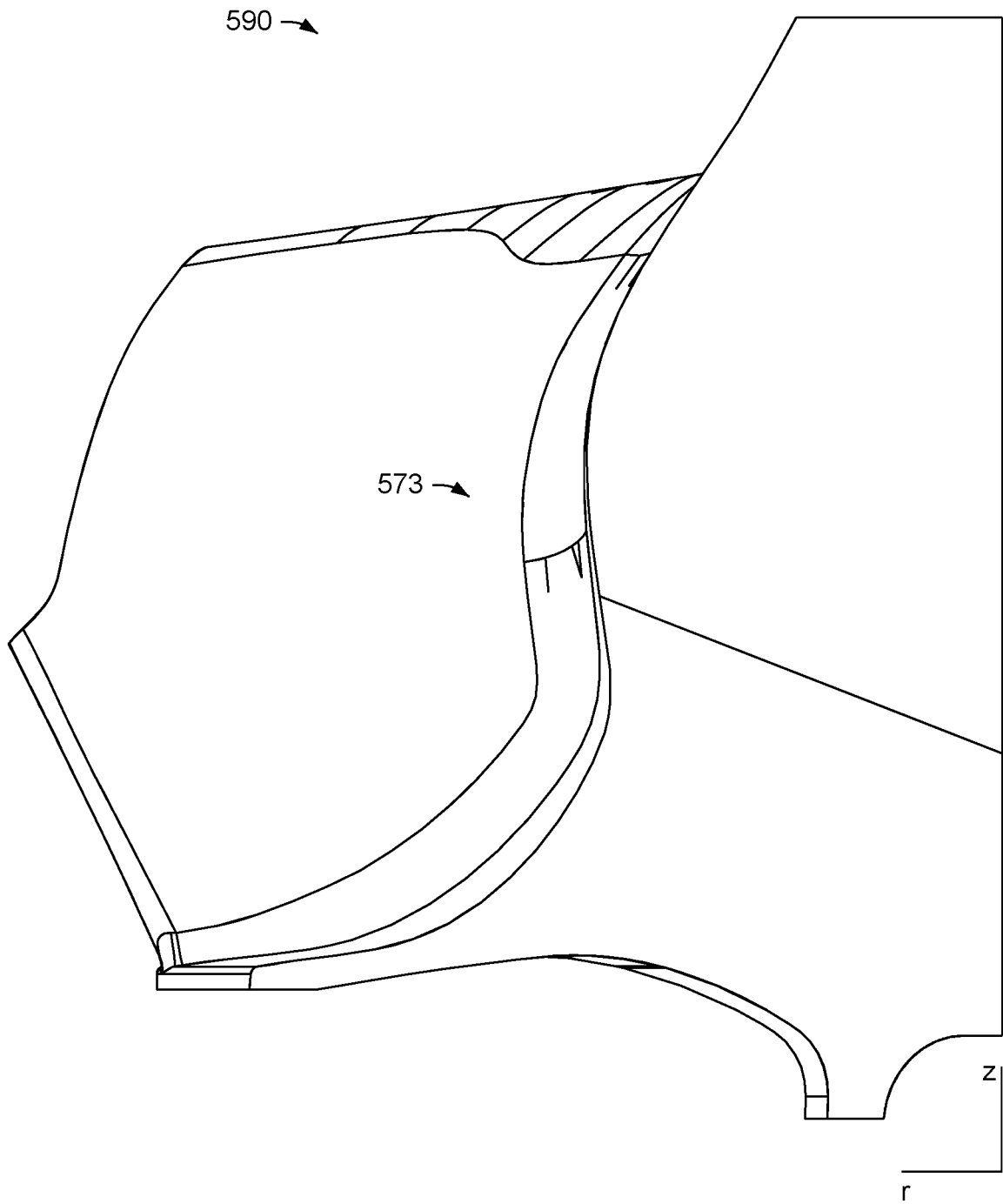
FIG. 10 is a side view of a portion of an example of a turbine wheel.

FIG. 9 and FIG. 10 show side views of the blade 590 from the pressure side and the suction side, respectively. In the views of FIG. 9 and FIG. 10, fillets 571 and 573 are shown in a transition from the hub 570 to the blade 590. Such fillets can provide structural support for the blade 590. Rather than a sharp corner transition, the fillets 571 and 573 can provide a smoother transition, which can be beneficial for one or more purposes (e.g., stress, fluid dynamics, etc.). FIG. 8 also shows approximate fillet transitions.

Figure 11:
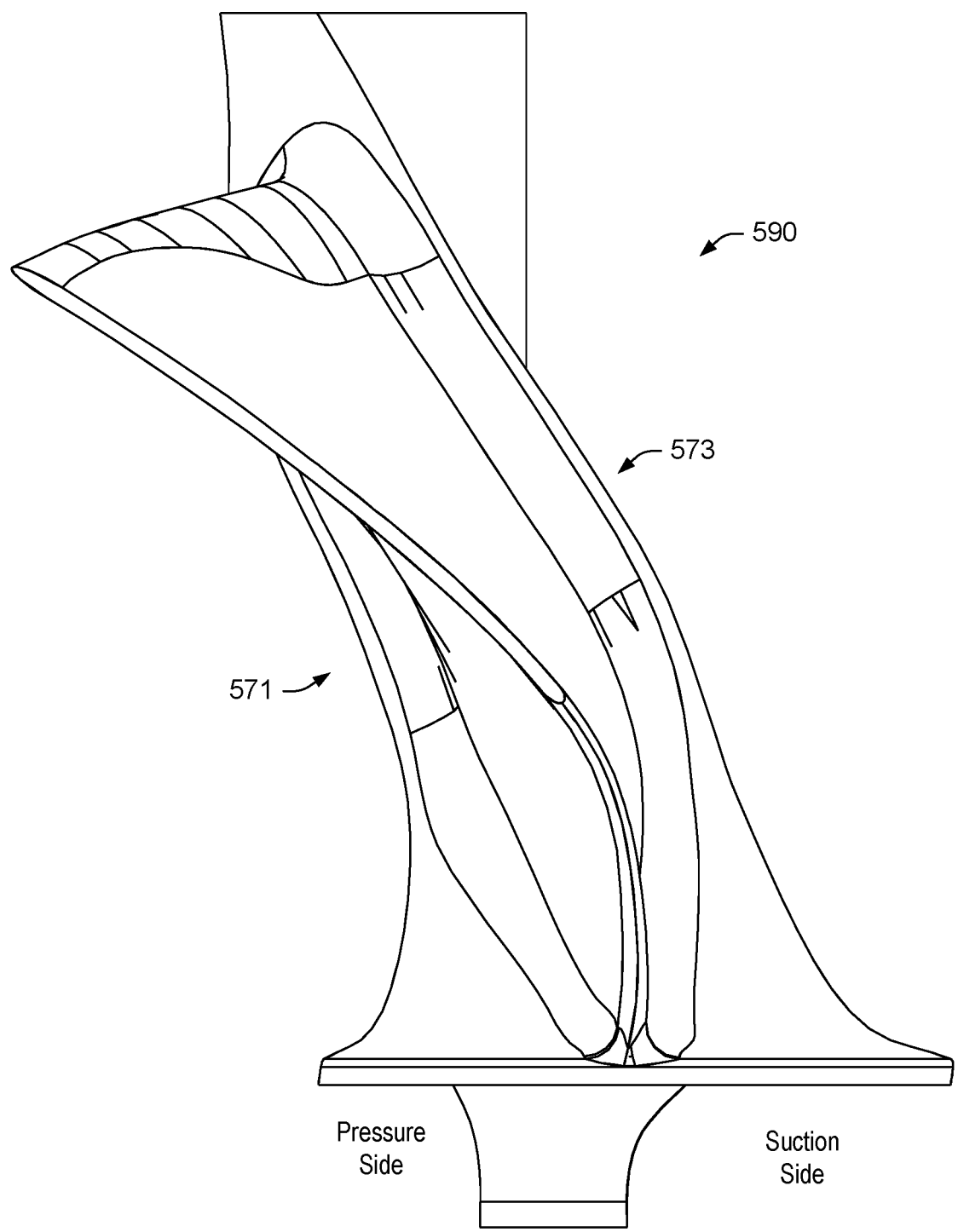
FIG. 11 is a radial view of a portion of an example of a turbine wheel.

FIG. 11 shows a radial end view of the blade 590, where the pressure side is to the left and the suction side is to the right. At least portions of the fillets 571 and 573 are also shown.

As explained, a turbine flow path between blades (airfoils) tends to be of an arc design with no inflexion points, without concern for its impact on performance. Referring again to FIG. 5, a dashed line represents an arc design hub profile. In contrast, the hub profile 596 includes at least one inflection point and can include multiple inflection points. For example, consider a hub profile with two inflection points. As described, the dashed line can be associated with a convex shape while the hub profile 596 can be associated with a concave shape (e.g., a shape with a concavity). The dashed line can define a smooth arced hub surface in a flow path direction while the hub profile 596 can define a cambered hub surface in a flow path direction.

Figure 12:
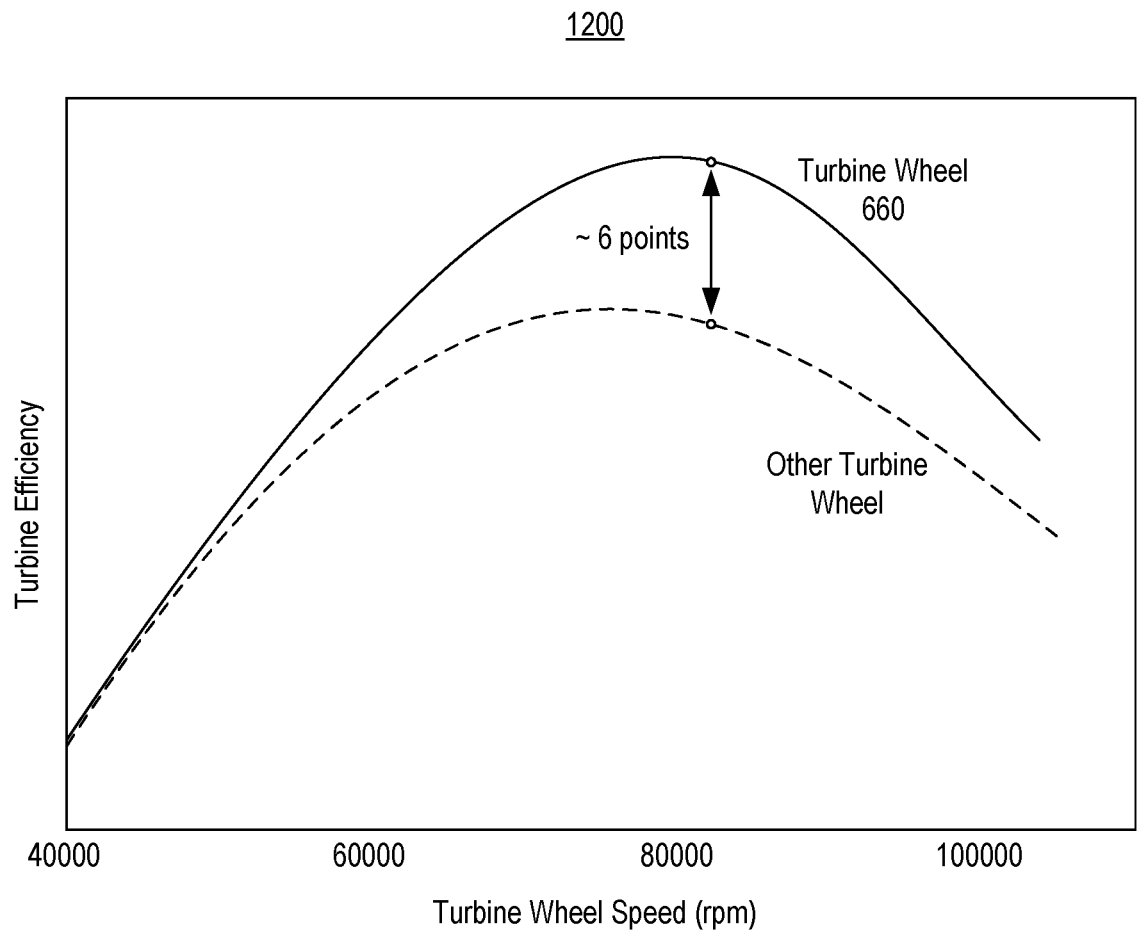
FIG. 12 is an example plot of turbine efficiency versus turbine speed.

FIG. 12 shows an example plot of turbine efficiency versus turbine wheel speed (rpm). As shown, the turbine wheel 660 with blades shaped such as the blade 590 demonstrated improved turbine efficiency compared to another turbine wheel with different blades.

As explained, a turbocharger turbine wheel can include a hub that includes a rotational axis, a backdisk and a nose, where the rotational axis defines an axial coordinate (z) in a cylindrical coordinate system that includes a radial coordinate (r) and an azimuthal coordinate ($\Theta$) in a direction of intended rotation about the rotational axis; and blades that extend outwardly from the hub, where each of the blades includes a hub profile, a shroud edge, a leading edge, a trailing edge, a pressure side, and a suction side, where the hub profile includes a global maximum radius and a global minimum radius, and where, between the global maximum radius and the global minimum radius, in an axial direction from the backdisk to the nose, the hub profile includes a local minimum radius at a first axial coordinate position and a local maximum radius at a second axial coordinate position.

As shown in the example of FIG. 8, the blade 590 can include blade thicknesses measured between the suction side and the pressure side. The thickness can represent material of construction with a corresponding material density that can define a mass. Distribution of mass, or mass distribution, can affect stresses within a blade and/or a turbine wheel. Overall mass and/or mass distribution can also affect bearing assembly operation. For example, a larger mass can demand a larger bearing assembly to provide stability and longevity at operational turbine wheel speeds; however, generally with increased bearing assembly losses that can decrease efficiency. A turbine wheel with blades such as the blade 590 can provide for a reduction in turbine wheel mass and bearing assembly size, both of which can provide for performance gains as well as increased longevity. A turbine wheel with blades such as the blade 590 can provide improved aerodynamic performance and increased longevity. As an example, the blade 590 can increase performance and durability of a turbine wheel or decrease mass and inertia of a turbine wheel, optionally without a penalty on performance, or the blade 590 may increase performance and durability and decrease mass and inertia. A blade such as the blade 590 may provide for tailoring performance with minimal mass and inertia.

As an example, a turbocharger turbine wheel can include a hub that includes a rotational axis, a backdisk and a nose, where the rotational axis defines an axial coordinate (z) in a cylindrical coordinate system that includes a radial coordinate (r) and an azimuthal coordinate ($\Theta$) in a direction of intended rotation about the rotational axis; and blades that extend outwardly from the hub, where each of the blades includes a hub profile, a shroud edge, a leading edge, a trailing edge, a pressure side, and a suction side, where the hub profile includes a global maximum radius and a global minimum radius, and where, between the global maximum radius and the global minimum radius, in an axial direction from the backdisk to the nose, the hub profile includes a local minimum radius at a first axial coordinate position and a local maximum radius at a second axial coordinate position. In such an example, the hub profile can include an inflection point between the local minimum radius and the local maximum radius.

As an example, a turbocharger turbine wheel can include a hub with a radial bulge between a backdisk of the hub and a nose of the hub. For example, the radial bulge may be span an axial mid-point of a blade as defined from an axial lowermost point on a leading edge of the blade to an axial uppermost point on a trailing edge of the blade.

As an example, a turbocharger turbine wheel can include blades and a fillet that transitions from a surface of a hub to a pressure surface of a respective one of the blades.

As an example, a turbocharger turbine wheel can include blades and a fillet that transitions from a surface of a hub to a suction surface of a respective one of the blades.

As an example, a turbocharger turbine wheel can include blades and a first fillet that transitions from a surface of a hub to a pressure surface of a first one of the blades and a second fillet that transitions from a surface of the hub to a suction surface of a second one of the blades, where, at an axial coordinate position that is greater than an axial coordinate position of a free tip of a leading edge of the first one of the blades, a point on an edge of the first fillet and a point on an edge of the second fillet are spaced apart by less than 1 mm or, for example, the point on the edge of the first fillet and the point on the edge of the second fillet can be spaced apart by less than 0.1 mm or, for example, the point on the edge of the first fillet and the point on the edge of the second fillet can meet.

As an example, a turbocharger turbine wheel can include blades and a first fillet that transitions from a surface of a hub to a pressure surface of a first one of the blades and a second fillet that transitions from a surface of the hub to a suction surface of a second one of the blades, where, at an axial coordinate position that is greater than an axial coordinate position of a free tip of a leading edge of the first one of the blades, a point on an edge of the first fillet and a point on an edge of the second fillet can be spaced apart by less than 1 mm. In such an example, at an axial coordinate position that is less than an axial coordinate position of the free tip of the leading edge of the first one of the blades, a point on an edge of the first fillet and a point on an edge of the second fillet can be spaced apart by more than 1 mm.

As an example, a turbocharger turbine wheel can include blades where a leading edge of each of the blades includes a mixed-flow leading edge. For example, a mixed-flow leading edge may be defined by an angle such as a cone angle. A mixed-flow leading edge can provide for directing flow radially and axially; whereas, a radial flow leading edge generally aims to direct flow radially. As an example, a turbocharger turbine wheel can include blades where a leading edge of each of the blades includes a radial-flow leading edge.

As an example, a turbocharger turbine wheel can include blades that extend outwardly from a hub, where each of the blades includes a hub profile, a shroud edge, a leading edge, a trailing edge, a pressure side, and a suction side, where the hub profile includes a global maximum radius and a global minimum radius, and where, between the global maximum radius and the global minimum radius, in an axial direction from the backdisk to the nose, the hub profile includes a local minimum radius at a first axial coordinate position and a local maximum radius at a second axial coordinate position where, for example, the first axial coordinate position can be within 20 percent of an axial coordinate position of a free tip of the leading edge of one of the blades.

As an example, a turbocharger turbine wheel can include blades that extend outwardly from a hub, where each of the blades includes a hub profile, a shroud edge, a leading edge, a trailing edge, a pressure side, and a suction side, where the hub profile includes a global maximum radius and a global minimum radius, and where, between the global maximum radius and the global minimum radius, in an axial direction from the backdisk to the nose, the hub profile includes a local minimum radius at a first axial coordinate position and a local maximum radius at a second axial coordinate position where, for example, the first axial coordinate position can be less than an axial coordinate position of a free tip of the leading edge of one of the blades.

As an example, a turbocharger turbine wheel can include blades that extend outwardly from a hub, where each of the blades includes a hub profile, a shroud edge, a leading edge, a trailing edge, a pressure side, and a suction side, where the hub profile includes a global maximum radius and a global minimum radius, and where, between the global maximum radius and the global minimum radius, in an axial direction from the backdisk to the nose, the hub profile includes a local minimum radius at a first axial coordinate position and a local maximum radius at a second axial coordinate position where, for example, the second axial coordinate position can be greater than an axial coordinate position of a free tip of the leading edge one of the blades.

As an example, a turbocharger turbine wheel can include blades where a root thickness of one of the blades increases with respect to an increasing axial coordinate position over at least a portion of an axial span between an axial coordinate position of a free tip of a leading edge of the one of the blades and an axial coordinate position of an end of a hub profile at a trailing edge of the one of the blades.

As an example, a turbocharger turbine wheel can include a blade number of a number of blades that is greater than three and less than thirty.

As an example, a turbocharger turbine wheel can include a hub profile that includes an S-shape.

As an example, a turbocharger turbine wheel can include blades that extend outwardly from a hub, where each of the blades includes a hub profile, a shroud edge, a leading edge, a trailing edge, a pressure side, and a suction side, where the hub profile includes a global maximum radius and a global minimum radius, and where, between the global maximum radius and the global minimum radius, in an axial direction from the backdisk to the nose, the hub profile includes a local minimum radius at a first axial coordinate position and a local maximum radius at a second axial coordinate position where, for example, the radial coordinate position of the hub profile is not monotonic with respect to increasing axial coordinate position in a direction from a backplate to a nose of the turbocharger wheel.

As an example, a turbocharger turbine wheel can include a hub profile where a first derivative of the hub profile changes signs between a global maximum radius and a global minimum radius. As an example, a hub profile may be represented by a parametric curve that includes at least one joint, where continuity at the joint is greater than $C^0$ continuity. A parametric curve can be defined in part by continuity in terms of differentiability. For example, $C^0$ continuity means that a curve is connected at joints, $C^1$ continuity means that a curve is connected as segments that share a common first derivative at a joint, and $C^n$ continuity means that segments share the same nth derivative at a joint.

Although some examples of methods, devices, systems, arrangements, etc., have been illustrated in the accompanying Drawings and described in the foregoing Detailed Description, it will be understood that the example embodiments disclosed are not limiting, but are capable of numerous rearrangements, modifications and substitutions.

What is claimed is:

1. A turbocharger turbine wheel comprising:
   a hub that comprises a rotational axis, a backdisk and a nose, wherein the rotational axis defines an axial coordinate (z) in a cylindrical coordinate system that comprises a radial coordinate (r) and an azimuthal coordinate ($\theta$) in a direction of intended rotation about the rotational axis; and
   blades that extend outwardly from the hub, wherein each of the blades comprises a hub profile, a shroud edge, a leading edge, a trailing edge, a pressure side, and a suction side, wherein the hub profile comprises a global maximum radius and a global minimum radius, and wherein, between the global maximum radius and the global minimum radius, in an axial direction from the backdisk to the nose, the hub profile comprises a single local minimum radius at a first axial coordinate position and a single local maximum radius at a second axial coordinate position, wherein the first axial coordinate position is less than an axial coordinate position of a free tip of the leading edge of one of the blades, and wherein the second axial coordinate position is greater than the axial coordinate position of the free tip of the leading edge of the one of the blades.

2. The turbocharger turbine wheel of claim 1, wherein the hub profile comprises an inflection point between the single local minimum radius and the single local maximum radius.

3. The turbocharger turbine wheel of claim 1, wherein the hub comprises a radial bulge between the backdisk and the nose.

4. The turbocharger turbine wheel of claim 1, comprising a fillet that transitions from a surface of the hub to the pressure side of a respective one of the blades.

5. The turbocharger turbine wheel of claim 1, comprising a fillet that transitions from a surface of the hub to the suction side of a respective one of the blades.

6. The turbocharger turbine wheel of claim 1, comprising a first fillet that transitions from a surface of the hub to the pressure side of a first one of the blades and a second fillet that transitions from a surface of the hub to the suction side of a second one of the blades, wherein, at an axial coordinate position that is greater than the axial coordinate position of the free tip of the leading edge of the first one of the blades, a point on an edge of the first fillet and a point on an edge of the second fillet are spaced apart by less than 1 mm.

7. The turbocharger turbine wheel of claim 6, wherein the point on the edge of the first fillet and the point on the edge of the second fillet are spaced apart by less than 0.1 mm.

8. The turbocharger turbine wheel of claim 6, wherein the point on the edge of the first fillet and the point on the edge of the second fillet meet.

9. The turbocharger turbine wheel of claim 6, wherein, at an axial coordinate position that is less than the axial coordinate position of the free tip of the leading edge of the first one of the blades, a point on an edge of the first fillet and a point on an edge of the second fillet are spaced apart by more than 1 mm.

10. The turbocharger turbine wheel of claim 1, wherein the leading edge comprises a mixed-flow leading edge.

11. The turbocharger turbine wheel of claim 1, wherein the leading edge comprises a radial-flow leading edge.

12. The turbocharger turbine wheel of claim 1, wherein the first axial coordinate position is within 20 percent of the axial coordinate position of the free tip of the leading edge of the one of the blades.

13. The turbocharger turbine wheel of claim 1, wherein a root thickness of one of the blades increases with respect to an increasing axial coordinate position over at least a portion of an axial span between the axial coordinate position of the free tip of the leading edge of the one of the blades and an axial coordinate position of an end of the hub profile at the trailing edge of the one of the blades.

14. The turbocharger turbine wheel of claim 1, comprising a blade number of the blades that is greater than three and less than thirty.

15. The turbocharger turbine wheel of claim 1, wherein the hub profile comprises an S-shape.

16. The turbocharger turbine wheel of claim 1, wherein radial coordinate positions of the hub profile are not monotonic with respect to increasing axial coordinate positions in a direction from the backdisk to the nose.

17. The turbocharger turbine wheel of claim 1, wherein a first derivative of the hub profile changes signs between the global maximum radius and the global minimum radius.

18. The turbocharger turbine wheel of claim 1, wherein the hub profile is represented by a parametric curve that comprises joints disposed between the global maximum radius and the single local maximum radius, wherein continuity at the joints is greater than $C^0$ continuity.

19. The turbocharger turbine wheel of claim 1, wherein the turbocharger turbine wheel has a reduced mass with the hub profile compared to another turbocharger turbine wheel with a different hub profile that comprises radial coordinate positions that monotonically decrease with respect to increasing axial coordinate positions in a direction from the backdisk to the nose.

\* \* \* \* \*